Jan. 14, 1936.  L. C. SHIPPY  2,028,021
MOLDING DEVICE
Filed Aug. 19, 1929  6 Sheets-Sheet 1

Inventor
Leo C. Shippy
By Spencer Hardman & Felt
His Attorneys

Jan. 14, 1936. L. C. SHIPPY 2,028,021
MOLDING DEVICE
Filed Aug. 19, 1929 6 Sheets-Sheet 2

Inventor
Leo C. Shippy
By Spencer Hardman & Fehr
His Attorneys

Jan. 14, 1936.  L. C. SHIPPY  2,028,021
MOLDING DEVICE
Filed Aug. 19, 1929   6 Sheets-Sheet 3
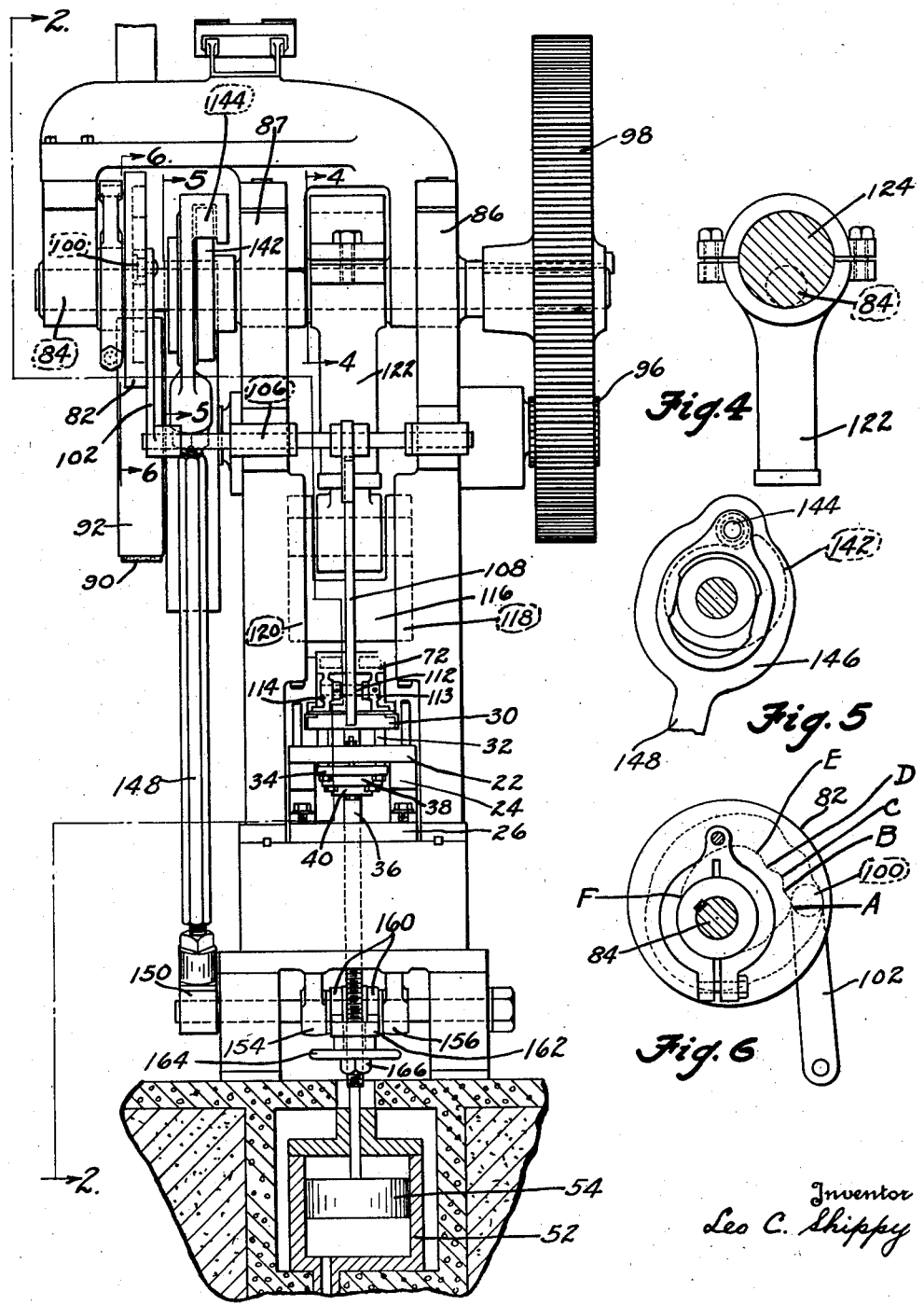

Jan. 14, 1936.                L. C. SHIPPY                2,028,021
                            MOLDING DEVICE
                         Filed Aug. 19, 1929          6 Sheets-Sheet 4

Inventor
Leo C. Shippy
By Spencer Hardman & Fehr
His Attorneys

Jan. 14, 1936.  L. C. SHIPPY  2,028,021
MOLDING DEVICE
Filed Aug. 19, 1929  6 Sheets-Sheet 5

Inventor
Leo C. Shippy
By
Spencer Hardman & Feko
His Attorneys

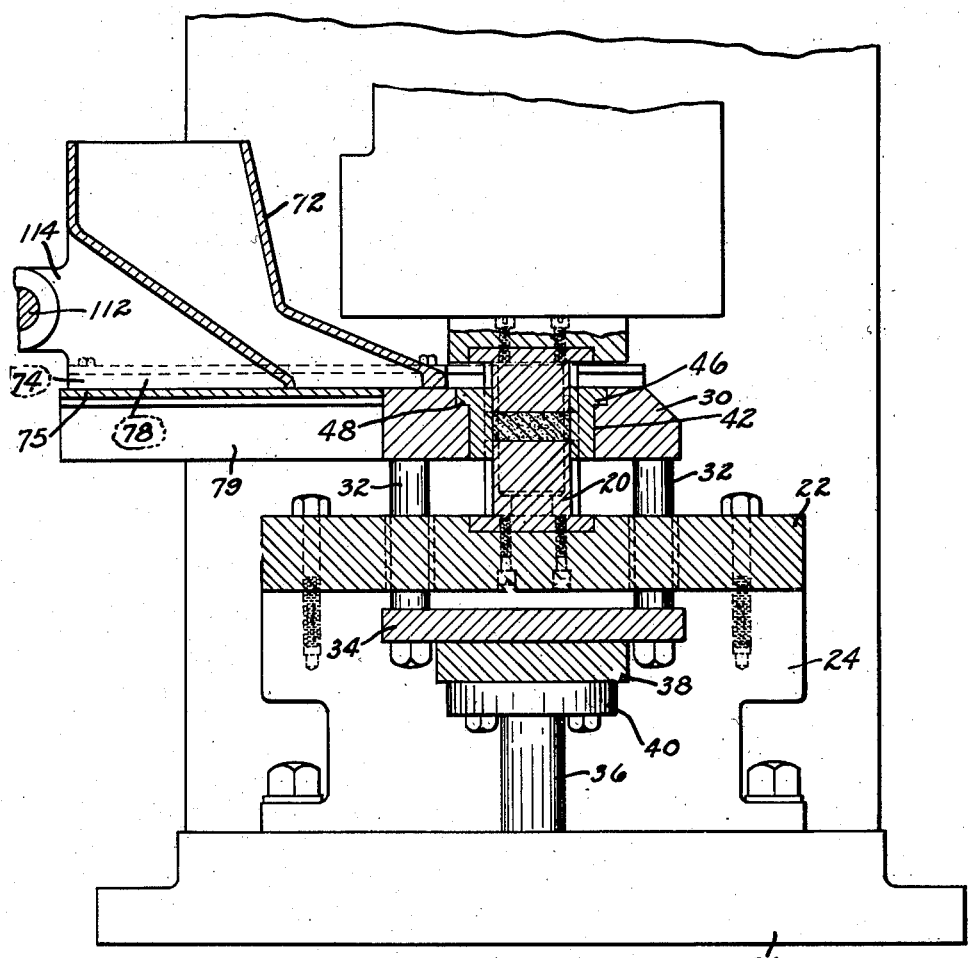

Patented Jan. 14, 1936

2,028,021

UNITED STATES PATENT OFFICE 2,028,021

MOLDING DEVICE

Leo C. Shippy, Anderson, Ind., assignor, by mesne assignments, to General Motors Corporation, Detroit, Mich., a corporation of Delaware Application August 19, 1929, Serial No. 386,836

4 Claims. (Cl. 18—16)

This invention relates to molding machines and particularly to machines of the type adapted to compress and mold powdered materials such as "Bakelite" or another phenol condensation product into pills or pre-mold.

An object of this invention is to compress the finely divided material equally. This has been accomplished by providing a floating mold having a cavity extending therethrough, a fixed ram projecting into one end of said cavity, a movable ram received by said cavity in opposed relation to said fixed ram so as to compress the material, the floating mold being moved by the resultant of all the forces acting upon it by the material so as to distribute the pressure substantially uniformly throughout the material, thereby producing a product which is uniformly compressed.

Another object of this invention is to provide means for filling the cavity in the mold. This has been accomplished by providing a hopper which is movable across the face of the mold and is movable with the mold.

Further objects and advantages of the present invention will be apparent from the following description, reference being had to the accompanying drawings wherein a preferred embodiment of one form of the present invention is clearly shown.

In the drawings:

Fig. 3 is an end elevation of the machine partly in section as viewed in the direction of the arrow 3 in Fig. 2.

Fig. 4 is a fragmentary sectional view taken on the line 4—4 of Fig. 3.

Fig. 5 is a fragmentary sectional view taken on the line 5—5 of Fig. 3.

Fig. 6 is a fragmentary sectional view taken on the line 6—6 of Fig. 3.

Fig. 10 is a fragmentary sectional view taken on the line 10—10 of Fig. 8 showing the position of the hopper while compressing the material.

Figs. 1 and 7 to 10 inclusive are drawn on a larger scale than Figs. 2 to 6 inclusive.

The machine embodying the present invention comprising in general four mechanisms; (a) a receptacle for containing the finely divided material such as bakelite or phenol condensation products which will be known hereafter as the die or mold, said die or mold comprising a floating member and a stationary member; (b) a mechanism for automatically filling the die or mold; (c) a mechanism for compressing the powder within the die; and (d) a mechanism for removing the compressed material which will be known as the "work" from the die and machine.

A die or mold for holding the material

Figure 2:
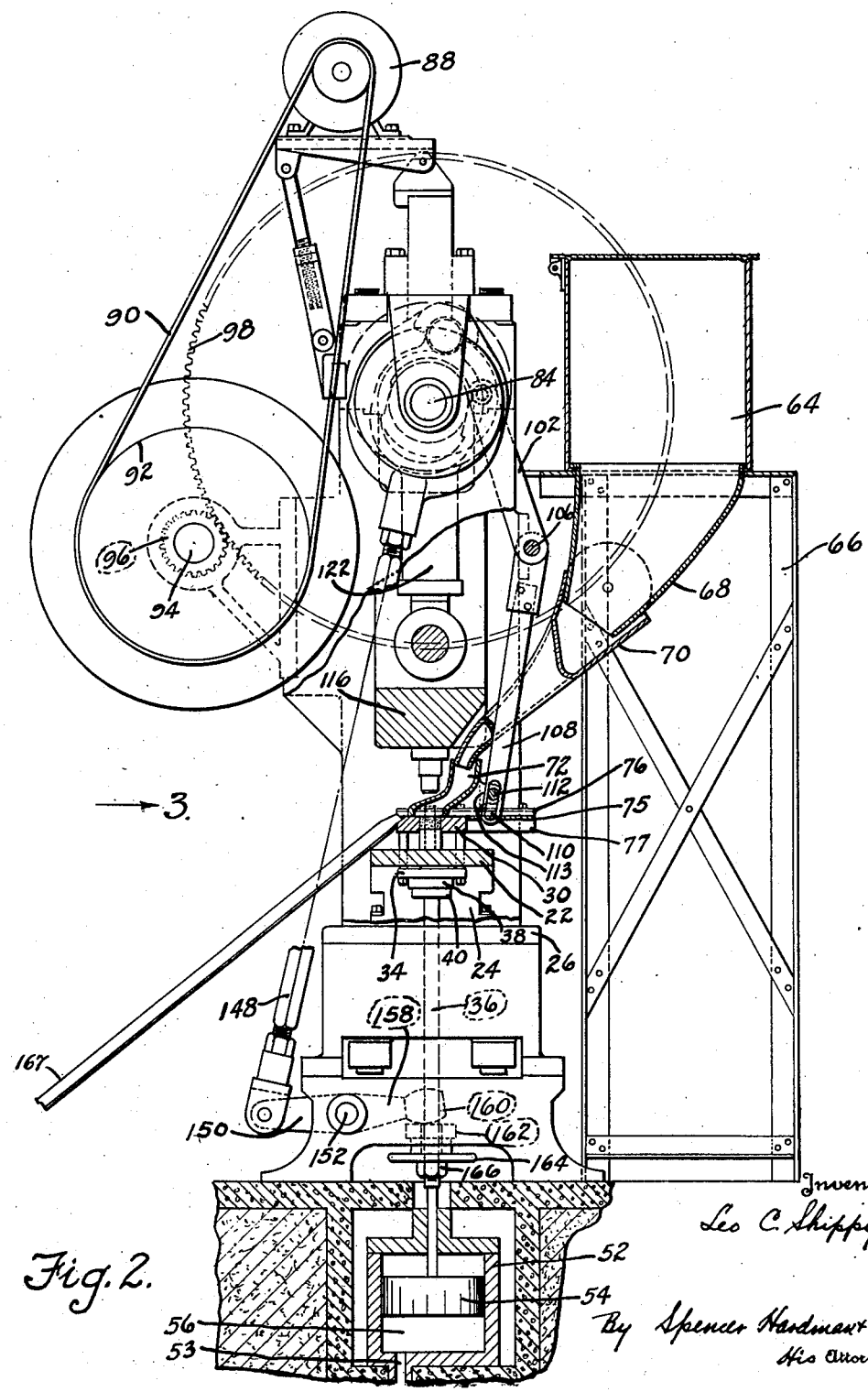
Fig. 2 is a side elevation of the machine taken on the line 2—2 of Fig. 3.

The die or mold comprises a floating chase 30 and a pair of stationary rams or end members 20, supported on a block 22, mounted on a pair of brackets 24, attached to the base 26. The floating chase 30 is carried on a plurality of supporting rods 32, mounted in a plate 34 which is supported by a piston rod 36. This piston rod terminates in a cylindrical portion 40 which carries the plate 38 fixedly attached to the plate 34. The floating chase 30 is provided with two cavities 42 and 44, each of which is provided with a die 46, only one of which is shown in section resting on the shoulder 48 integral with the chase 30. The upward movement of the chase 30 is limited by a set screw 50, seated in member 22 engaging the plate 34. The piston rod 36 passes through the base 26 into a cylinder 52 where it is connected to a piston 54. The cylinder 52 as disclosed in this modification is mounted below the level of the floor as best seen in Fig. 2. With only a slight modification the piston could be mounted in the base 26.

The pressure supplied to the chamber 56 through the inlet 53 is sufficient to hold the chase 30 in equilibrium. The operation of the chase 30 will appear more fully later.

Mechanism for automatically filling the die or mold

Figure 1:
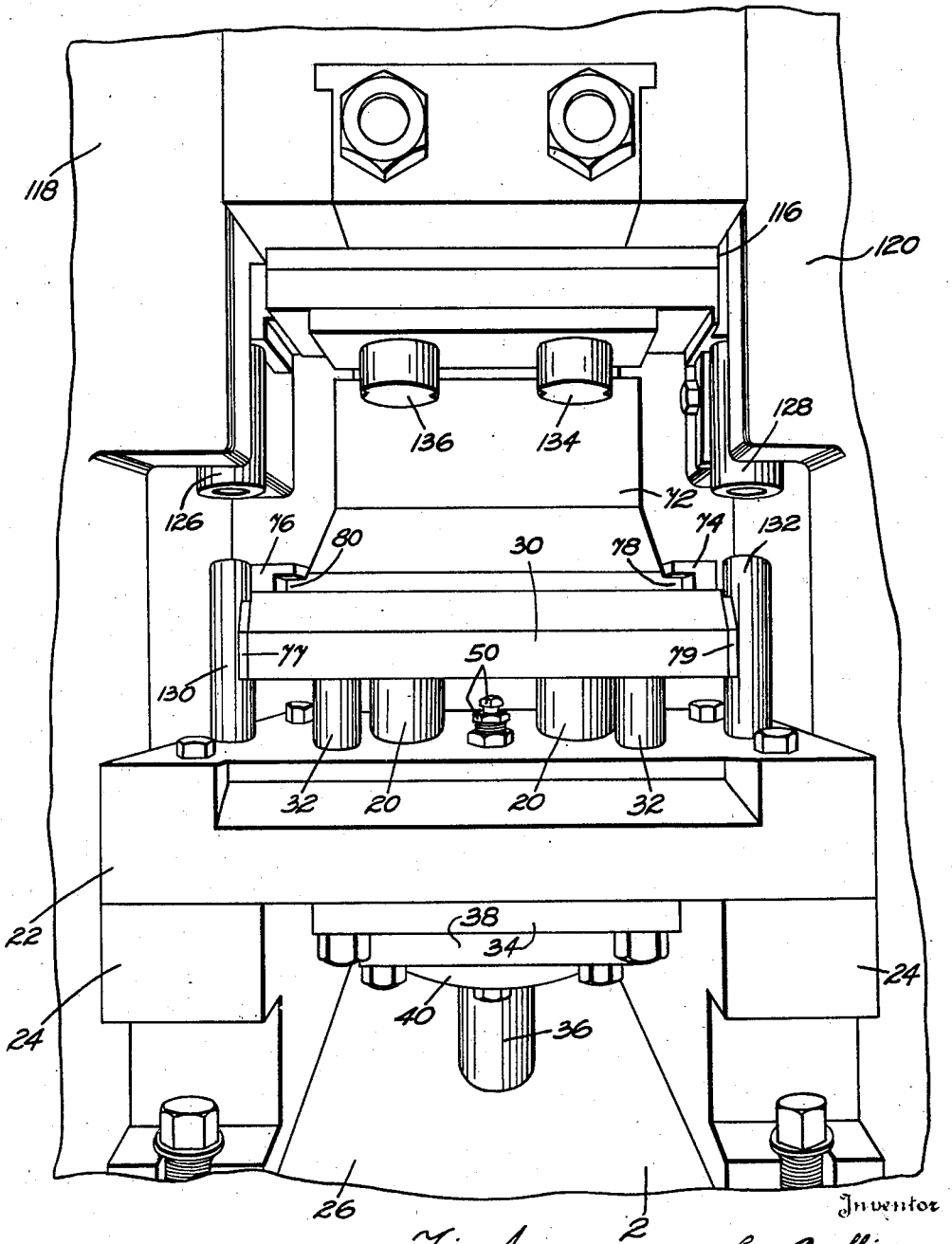
Fig. 1 is an enlarged fragmentary view of the mold in the home position showing the cavities being filled.
Figure 7:
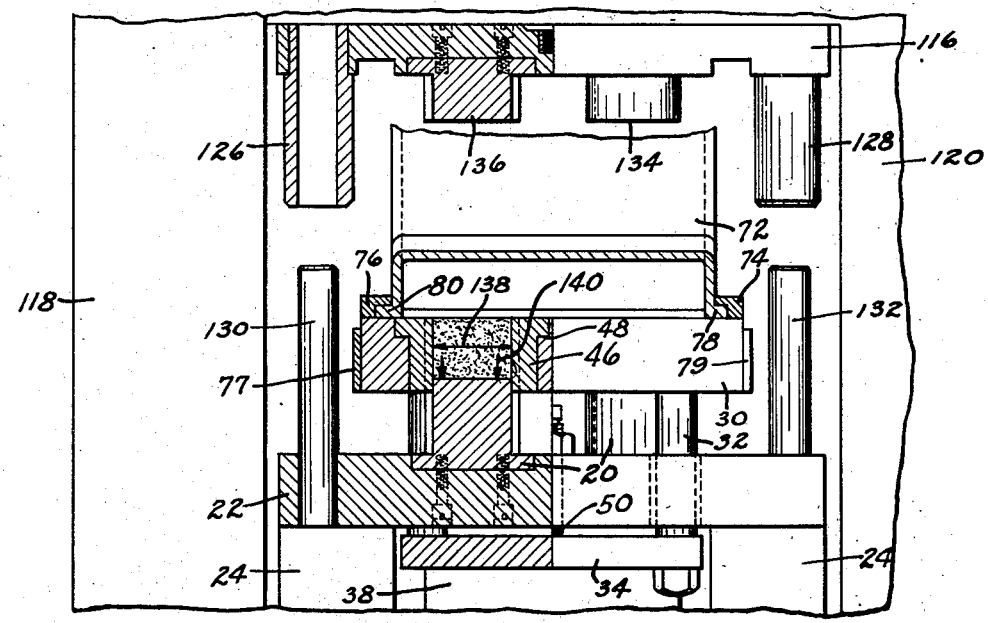
Fig. 7 is a view similar to Fig. 1 with parts in section.

When the chase 30 is in the up position as viewed in Figs. 1, 2 and 7, the mold is filled from a hopper arrangement which includes a stationary container 64 mounted upon a frame 66. The container 64 terminates in a reduced portion 68 which has pivotally mounted thereon a funnel 70 which extends into a movable shaker 72. The flanges 78 and 80 integral with the shaker 72 cooperate with the L-shaped guides 74 and 76, attached to the chase 30 and the floor plate 75 carried on the brackets 77 and 79 which are also attached to the chase 30. When the shaker 72 is reciprocated over the chase 30, and the plate 75 the cavities in the dies are filled by the powdered material such as a phenol condensation product from the shaker 72, which is supplied from the hopper 64, through the funnel 70.

As best seen in Figs. 2 and 3 the shaker 72 is reciprocated by a cam 82, keyed to a shaft 84, journalled in the standards 86 and 87 of the press and driven from an electric motor 88 through a belt 90. The belt 90 drives a pulley 92 keyed to a shaft 94 carrying a pinion 96, engaging the gear 98, keyed to the shaft 84. The cam 82 actuates the cam follower 100 attached to an arm 102, keyed to a shaft 106, carrying an arm 108 having a slot 110 through which passes a pin 112, carried by brackets 113 and 114 integral with the shaker 72.

As the shaft 84 is rotated, the cam 82 actuates the cam follower 100 so as to cause a reciprocating movement of the shaker 72 so as to completely fill the cavities in the chase 30. That is, the cam follower 100 moves from the crest A to the valley B then to the crest C etc. as seen in Fig. 6 and diagrammatically in Fig. 11. The shaker 72 is moved back and forward until the cam follower 100 reaches the crest E whence it is gradually actuated towards the center of the shaft 84 from E to F as may best be seen in Fig. 6 and schematically in Fig. 11. When the cam follower 100 reaches the point F the shaker has been moved to the left as seen in Fig. 10 so that the material within the die 46 may be compressed.

Material compressing mechanism

The reciprocating cross head 116 is guided in the sides 118 and 120 integral with the standards 86 and 87 in a manner well known to those skilled in the art. A reciprocating movement is imparted to the cross head 116 through the connecting rod 122 actuated by the eccentric 124 carried by the shaft 84. The cross head 116 carries a pair of tubular members 126 and 128 cooperating with the leader pins or pilots 130 and 132 so as to properly align the movable rams 134 and 136, carried by the cross head 116 with the dies 46 in the chase 30. After the rams 134 and 136 compress the material contained in the dies against the fixed rams 20, the material will exert a pressure on the walls of the die. These forces may be resolved into two components; one at right angles to the walls of the die 46 and the other parallel to the walls of the die 46 as indicated by the arrows 138 and 140 respectively, as seen in Fig. 7. As the forces exerted in the direction normal to the walls of the die 46 are equal and opposite in magnitude the only forces that influence the position of the chase 30 are the forces indicated by the arrows 140 acting parallel to the walls of the die. If the chase 30 were not to move, the material along the outer edge and adjacent to the movable ram would be compressed the most, and the material along the outer edge adjacent to the fixed ram 20 would be compressed the least, because of the binding action between the walls of the die 46 and the material. As the chase 30 is held practically in equilibrium, it being biased upwardly slightly, a very slight force will move the chase 30 downwardly from the position shown in Fig. 7 to the position shown in Fig. 8. For this reason the material will be pressed substantially uniform throughout as the resultant of all of the forces set up in the material acting parallel to the walls of the die 46 will move the chase 30 downwardly a distance equal to approximately one-half the distance through which the upper surface of the material within the cavity moves while being compressed from that shown in Fig. 7 to that shown in Fig. 8.

Mechanism for removing the work from the die

Figure 8:
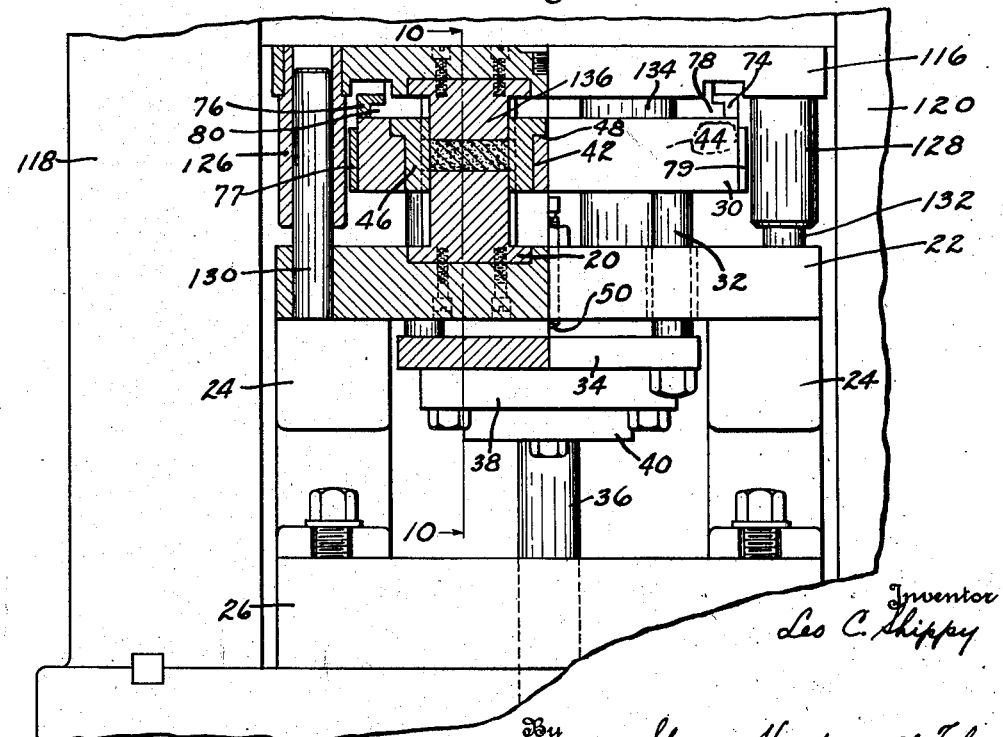
Fig. 8 is a view partly in section showing the mold immediately after the material has been compressed.
Figure 9:
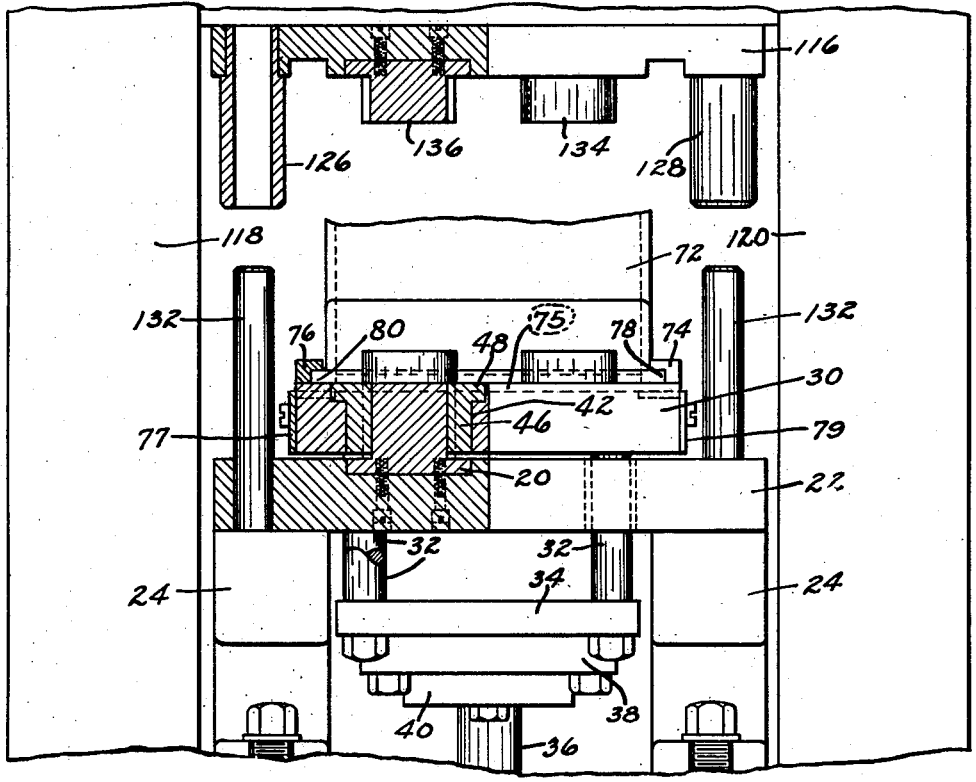
Fig. 9 is a fragmentary view partly in section showing the device immediately after the compressed material has been ejected from the cavities in the mold but before the compressed material has been ejected from the face of the mold.

After the material has been compressed into the form disclosed in Fig. 8, the movable rams 134 and 136 are raised upwardly to the position disclosed in Fig. 9. As the rams advance upwardly from the position disclosed in Fig. 8 to the position disclosed in Fig. 9, the piston 54 and the chase 30 are moved downwardly by a mechanism which includes a cam 142 mounted on the shaft 84. The cam 142 actuates a cam follower 144 attached to one end 146 of the link 148, which is pivotally attached to a rocker arm 150 keyed to a shaft 152.

Intermediate the brackets 154 and 156 is found an arm 158 terminating in a bifurcated portion 160 straddling the piston rod 36 and engaging an annulus 162 adjustably mounted on the piston rod 26 and held in position by the lock nuts 164 and 166. As the cam follower 144 is raised by the cam 142 as best seen in Figs. 2 and 3 the piston is moved downwardly to the down position which causes the floating chase 30 to be lowered from the position disclosed in Fig. 8 to the position disclosed in Fig. 9 so that the upper surface of the chase 30 is substantially flush with the upper surface of the fixed rams 20. While in this position the shaker 72 shoves the work from the chase 30 as may best be seen in Fig. 2 into a chute 167 provided therefor.

Operations occurring during one machine cycle

Figure 11:
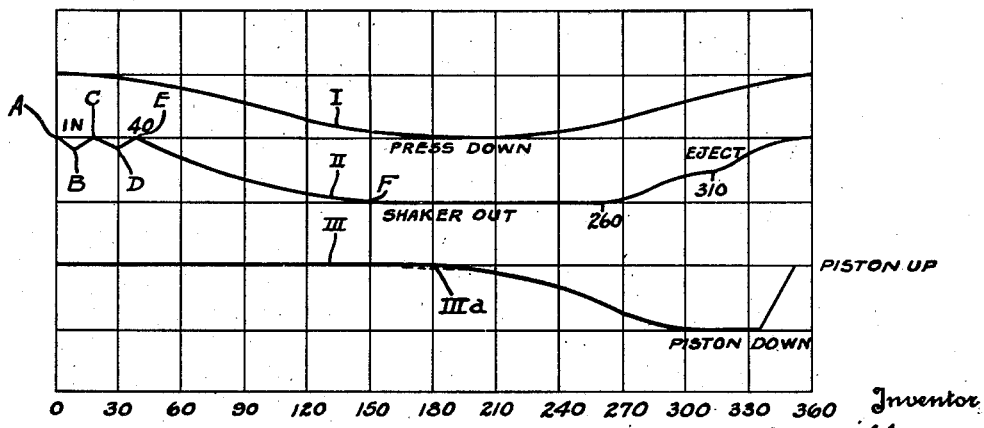
Fig. 11 shows a group of curves which indicate the relative position of the press, the shaker and of the piston actuating the floating mold during one cycle of the machine.

The curves I, II, and III disclosed in Fig. 11 indicate the relative position of the chase 30, the shaker 72, and the cross head 116 respectively, as the shaft 84 rotates through one revolution. Fig. 2 shows the relative position of the parts indicated by the zero degree position of the curves.

Curve I, which is a cosine curve, is governed by the eccentric 124; curve II by the shape of cam 82 and curve III by the shape of the cam 142. As the eccentric 124 and the cams 82 and 142 are attached to the shaft 84 each of these rotates in unison. In Fig. 11 it may be seen that the shaker 72 is reciprocated back and forth across the face of the chase 30 while the shaft 84 rotates through an angle of approximately 40° so as to completely fill the cavities in the molds. During this shaking of the shaker 72, the cross head 116 has advanced only a slight distance toward the chase 30. When the shaft 84 rotates from the 40° position to the 150° position, the cam follower 100 reaches the point F shown in Fig. 6 from whence it follows the arc of a circle for about 110 degrees. That is, the shaker does not move horizontally while the shaft is moving from the 150 degree position to the 260 degree position. During the interval that the shaker does not move horizontally, the reciprocating cross head 116 comes to the down position as indicated by curve I so as to compress the material in the cavity of the mold. As the material is pressed towards the stationary rams the chase 30 moves downward as indicated by the dotted line IIIa a distance equal to about one-half the distance that the thickness of the material is reduced.

When the reciprocating cross head begins to move upwardly, cam 142 will cause the cam follower 144 to move away from the center of the shaft 84 so as to force the piston 54 and the chase 30 to the down position disclosed in Fig. 9 against the force of the pressure supplied to the cylinder and the down position of the curve disclosed in Fig. 11, raising the piston when the shaft has rotated through approximately 315 degrees. While the chase is moved downwardly the shaker is moved inwardly as indicated in Fig. 11 by curve II. The inward movement of the shaker begins when the shaft 84 has rotated through an angle of about 260 degrees and it engages the work when the shaft 84 has rotated through 310 degrees so as to eject the work while the shaft is being rotated through the balance of one revolution. When the shaft has rotated approximately 355 degrees, the cam follower 144 is permitted to move inwardly so that the piston moves from the down position to the up position by the slight upward bias caused by the pressure supplied by the cylinder to the zero position.

As the motor 88 drives the mechanism continuously it can be readily seen that the machine will continue to make pre-forms or briquettes automatically.

While the form of embodiment of the present invention, as herein disclosed, constitutes a preferred form, it is to be understood that other forms might be adopted, all coming within the scope of the claims which follow.

What is claimed is as follows:

1. A device for forming powdered material into blanks comprising, in combination, a mold member having an aperture; a stationary ram extending partly into said aperture; a shaft; a crank arm on said shaft; a second ram moved by said crank arm toward and into said aperture; a piston under constant fluid pressure urging the mold member toward the movable ram; a stop preventing such movement of the mold member when the latter attains a certain position relative to the stationary ram; a cam on said shaft; and a cam follower cooperating therewith for moving the mold member away from the movable ram thereby exposing the formed blank.

2. A device for forming powdered material into blanks comprising, in combination, a mold member having an aperture; a stationary ram extending partly into said aperture; a shaft; a crank arm on the shaft; a second ram moved by the crank arm toward and into the aperture for compressing the powdered material therein; a piston under constant fluid pressure urging the mold member toward the movable ram; a stop preventing such movement of the mold member when the latter attains a certain position relative to the stationary ram; a cam on said shaft; a cam follower cooperating therewith for moving the mold member away from the movable ram thereby exposing the formed blank; a container with open ends, one end resting flush on the mold member adjacent the movable ram; a funnel containing a supply of powdered material, said funnel extending into the other end of the container and being movable therewith; a cam on the shaft for reciprocating the container from a retracted position into alignment with the aperture and into retracted position again, said cam being so timed with the first mentioned cam that the exposed blank is pushed from its forming position by the approaching container; and another cam on the shaft for shaking the container when the open end of the latter communicates with the aperture in the mold member.

3. A device for forming powdered material into blanks comprising, in combination, a mold member having an aperture; a stationary ram extending partly into said aperture; a shaft; a crank arm on the shaft; a second ram moved by the crank arm toward and into the aperture for compressing the powdered material therein; a piston under constant fluid pressure urging the mold member toward the movable ram; a stop preventing such movement of the mold member when the latter attains a certain position relative to the stationary ram; a cam on said shaft; a cam follower cooperating therewith for moving the mold member away from the movable ram thereby exposing the formed blank; guides on the mold member adjacent the movable ram; a container with open ends movable in said guides and having one end resting flush on the mold member; a funnel containing a supply of powdered material, said funnel extending into the other end of the container and being movable therewith; and another cam on the shaft for moving the container toward the exposed blank and push the same from its forming position until the open end of the container communicates with the aperture in the mold member; said cam also causing the container to be shaken while the open end of the latter communicates with the aperture in the mold member.

4. A device for forming powdered material into blanks comprising, in combination, a mold member having a bore therethrough; a movable and a stationary plate member; pins in one of the plate members for guiding the movable plate member in the direction of the bore axis in the mold member; aligning cylindrical rams on said plate members, the one on the stationary plate partly extending into the bore and the other moving into said bore to compress the powdered material therein; a piston under constant fluid pressure urging the mold member toward the movable plate member; a stop preventing such movement of the mold member when the latter obtains a certain position relative to the stationary plate member; a power driven shaft; a cam on said shaft; a cam follower cooperating therewith for moving the mold member away from the movable plate member thereby exposing the formed blank; guides on the mold member adjacent the movable plate member; a container with open ends movable in said guides and having one end resting flush on the mold member; a stationary hopper containing a supply of powdered material; a funnel communicating with the lowermost part of the hopper and pivoted thereto and projecting into the other end of the container regardless of movement of the latter in any direction; and another cam on the shaft for moving the container toward the exposed blank and push the same from its forming position until the open end of the container communicates with the aperture in the mold member; said cam also causing the container to be shaken while the open end of the latter communicates with the aperture in the mold member.

LEO C. SHIPPY.